J. A. BEIERSCHMITT.
AUTOMOBILE REST.
APPLICATION FILED AUG. 25, 1917.
1,271,421.
Patented July 2, 1918.
2 SHEETS—SHEET 1.
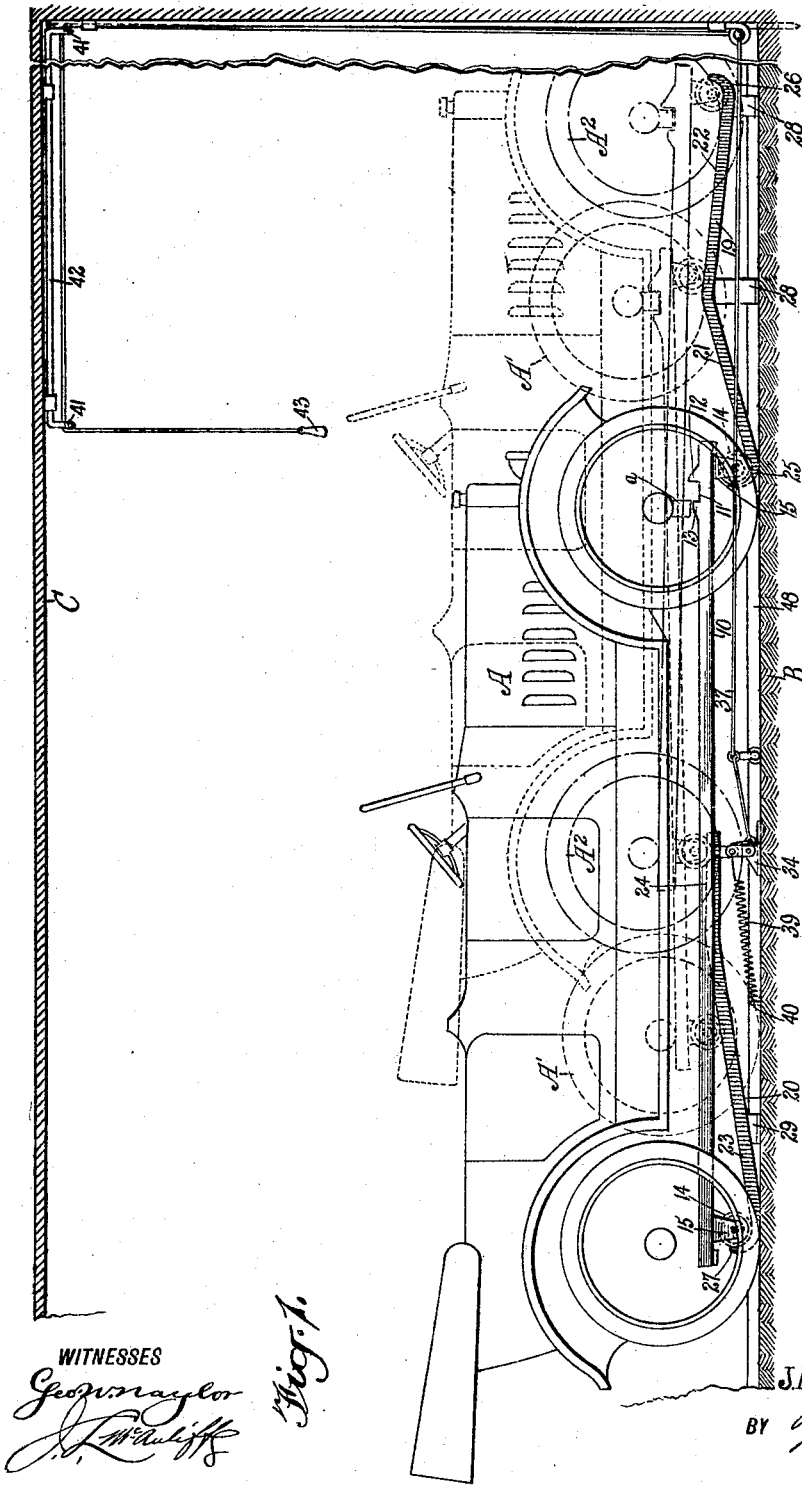
WITNESSES
INVENTOR
J.A.Beierschmitt
BY
ATTORNEYS

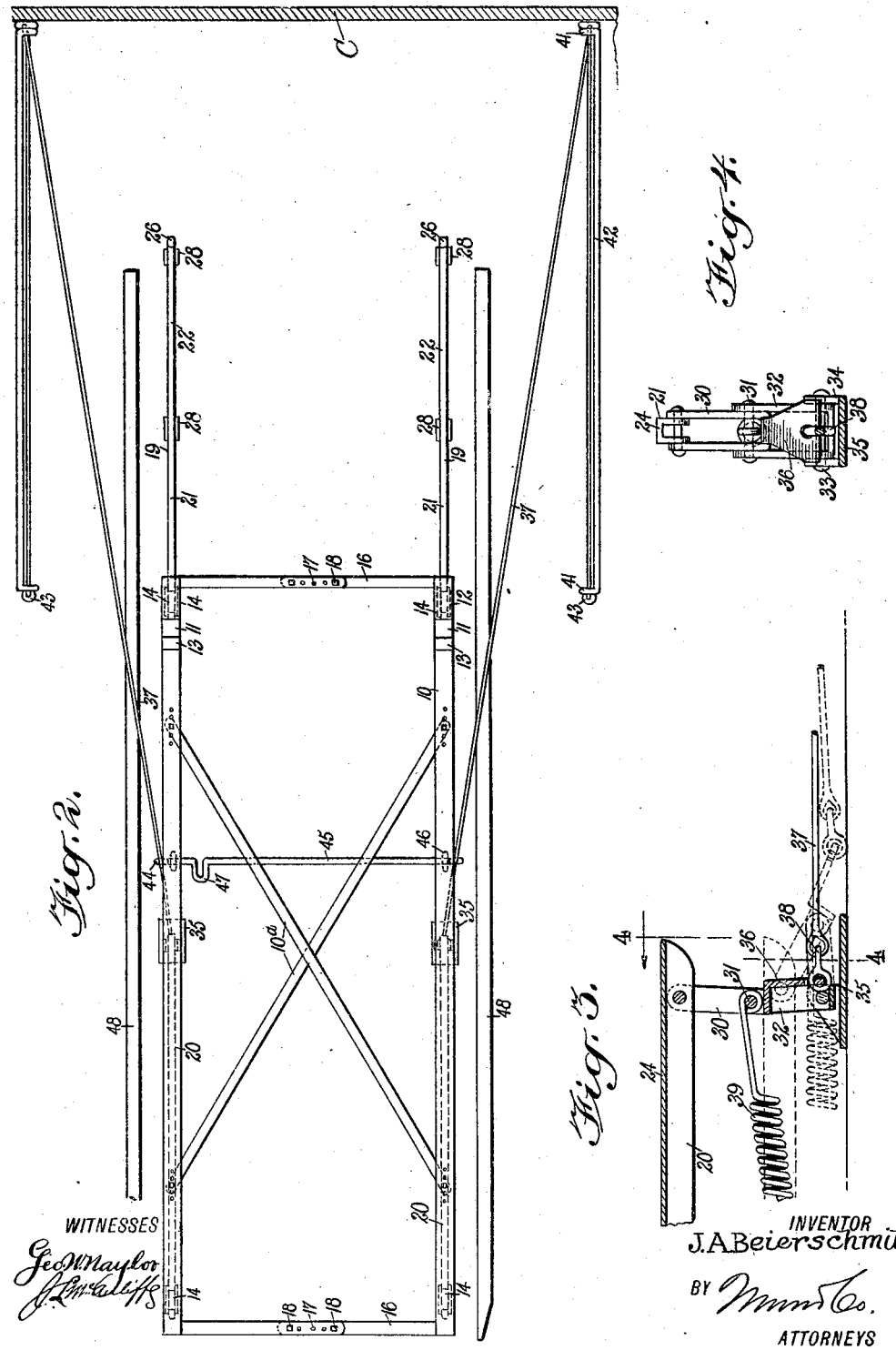

UNITED STATES PATENT OFFICE.

JOHN A. BEIERSCHMITT, OF FAIRBANK, IOWA.

AUTOMOBILE-REST.

1,271,421.   Specification of Letters Patent.   Patented July 2, 1918.

Application filed August 25, 1917. Serial No. 188,252.

*To all whom it may concern:*

Be it known that I, JOHN A. BEIER-SCHMITT, a citizen of the United States, and a resident of Fairbank, in the county of Buchanan and State of Iowa, have invented a new and Improved Automobile-Rest, of which the following is a full, clear, and exact description.

My invention relates to a rest or jack whereby an automobile may be lifted by its own power when in the garage to relieve the tires from the weight of the machine, and more particularly the invention relates to a rest or jack involving the use of a platform or frame adapted to have limited travel on front and rear track rails when the automobile is run over the platform and the front axle thereof engaged with said platform.

An object of the invention is to provide a device of the indicated character in which the rear track rails may be permitted vertical rocking movement for the purpose of lowering the raised automobile to a position that the rear wheels of the automobile may be lowered to the floor surface whereby the traction of said wheels will result in the automobile freeing itself from the jack.

Other objects of the invention and its advantages will appear as the description proceeds.

Reference is to be had to the accompanying drawings forming a part of this specification in which similar reference characters indicate corresponding parts in all the views, it being understood that the drawings are merely illustrative of one example of the invention.

Figure 1 is a side elevation of an automobile rest or jack embodying my invention and illustrating an automobile to show the mode of action of the jack;

Fig. 2 is a plan view of the said rest, a portion of the wall of a garage or the like being in section;

Fig. 3 is an enlarged longitudinal vertical section of the front end of a rear track rail and elements associated therewith;

Fig. 4 is a transverse vertical section on the line 4—4, Fig. 3.

In carrying out my invention in accordance with the illustrative example, a platform or frame 10 is provided presenting longitudinal side bars having notches 11 in the top thereof, adjacent to the front end of the platform, said notches being produced in the given example by front lugs 12 and rear lugs 13, the said rear lugs being of slightly less height than the lugs 12. The platform 10 has front and rear running wheels 14, here shown as turning in depending brackets 15 at the under side of the platform. In addition to its side bars, the platform 10 has front and rear cross bars 16 formed of overlapping sections having bolt holes 17 to receive a bolt or bolts 18 for varying the width of the platform, and the sides may be connected also by crossed braces 10ª.

The wheels 14 of the platform 10 are adapted to run on front rails 19 and rear rails 20. The front rails are inclined to present ramps 21 on which the front wheels 14 may travel upwardly, the forward portions 22 of said front rails having a slight dip as clearly seen in Fig. 1. Similarly the rear rails 20 present ramps 23 for the major portion of their length and approximately horizontal or slightly downwardly inclined front portions 24. The front rails have upturned rear ends 25 and upturned front ends 26 constituting stops and the rear wheels 20 have at their rear ends similarly upturned stops 27, the front ends of the rear rails being without stops. The front rails are rigidly supported by any suitable means, there being shown standards 29 for the purposes. The rear rails 20, on the contrary, are pivoted to standards or floor brackets 29 adjacent to the rear ends of the rails, thereby permitting said rear rails to be rocked vertically on their pivots.

The front ends of the rear rails are supported by elements permitting the said front ends to be lowered. In the illustrated example a U-shaped link 30 is pivotally connected at its upper end with each rail 20, and the lower end of said link is pivotally connected as at 31 with a link or stirrup 32, the lower end of which is pivoted as at 33 to the side flanges 34 of a floor bracket 35. The elements 30 and 32 constitute in effect a toggle link which may break joint in one direction, but which in the normal position will sustain the rails 20 against being depressed; the link 30 has rigid therewith a downwardly extending arm 36 adapted to bear against the link 32 or the bracket flanges 34, or both, when the track rail is raised. Attached to the arm 36 is a pull cord 37 connected with said arm by any suitable means as by an eye member 38. The arrangement is such that a pull on the rope or cord 37 will cause the links 30, 32 to break joint in a forward direction, thereby permitting the rail 20 to rock downwardly at its front end. The links 32 are under the action of a retractile spring 39 secured at its rear end as at 40 to any fixed member, such as a pin 40 in the floor B. There is a rope 37 at each side of the track and connected with respective arms 36, said ropes running in practice over suitable guides 41, here shown as on a rod 42 secured to the ceiling of a garage C, the free ends of the rope being permitted to hang and provided with suitable handles 43, whereby the driver of an automobile A that has been raised, may exert a pull on either cord. In order that a pull on either cord may operate both cords I connect the latter with eyes 44 formed on the cranked ends of a transverse rock shaft 45 adapted to turn in bearings 46 on the garage floor, there being a lateral arm or bend 47 in the crank rod at an angle to the end cranks, the arrangement being such that the end cranks or the intermediate bend 47 limits the rocking of the shaft in either direction in response to a pull on a rope 37 or the reaction of the springs 39.

With the described arrangement the automobile A is run over the platform 10, the said platform being initially in the full line position shown in Fig. 1. The engagement of the front axle a against the forward lugs 12 will cause the platform to travel with the automobile. The momentum of the automobile will cause it to carry the platform 10 forwardly until the ramps 21, 23 result in the elevation of the platform 10 and the lifting of the automobile so that the wheels thereof are off the floor of the garage and thus relieved of the weight of the machine. In the forward movement of the automobile to its final raised position, the front wheels and rear wheels will take the intermediate position indicated in dotted lines at A' at which time the front wheels 14 of the platform will have arrived at the upper ends of the inclines 22, the gravity of the front end of the automobile and its momentum serving to cause the front wheels to travel down the inclines 22, while the rear wheels will be carried forwardly on the top surfaces 24 of the rear tracks, the wheels finally taking the positions indicated at A² in Fig. 1 at which time the front stops 26 of the front tracks will arrest the movement of the platform 10, leaving the automobile at rest thereon in the raised position.

When it is desired to run the automobile off the platform 10, a pull on a rope 37 will cause the links 30, 32 to break joint in a forward direction and collapse under the weight of the automobile, thereby permitting the front ends of the rear tracks 20 to drop, said rear tracks rocking on their pivots; the result will be that the rear wheels of the automobile will be lowered to the floor B so that the engine having been started to back the automobile, the front axle a by engaging the rear lugs 13 will cause the platform 10 to travel rearward on the tracks 19, 20, until the platform 10 again reaches the lowered full-line position of Fig. 1 with all four wheels of the automobile on the ground and the axle a freed from the notch 11.

It will be observed therefore that with the above described construction the car at the rear end is directly dropped into tractional engagement with the floor surface and upon the starting of the motor and the reverse gear thrown in, the power of the car positively causes the car to travel rearwardly carrying with it the platform 10. It will be seen therefore that the attention of the operator is not divided by simultaneously having to operate the car-lowering devices and at the same time control his car, a performance which obviously is difficult and is wholly avoided by my device.

In practice I provide on the floor of the garage guard rails 48 which serve also as a guide for the driver in centering the automobile over the platform 10.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. In a device of the class described, a platform front and rear tracks on which said platform is adapted to travel, the rear tracks being rockably mounted, movable means to sustain the rear tracks in raised position and operable to permit said tracks to lower, and means on the platform adapted to be engaged by an automobile to move the same forward or back on the tracks.

2. In a device of the class described, a platform, fixed front and rear tracks on which said platform is adapted to travel, the rear tracks being mounted for vertical rocking movement, toggle links supporting the forward ends of said tracks, manually controlled means to cause said toggle links to break joint for permitting the said rear tracks to lower, and spring means tending to return the toggle links to their normal position.

3. A device of the class described, including a platform having notches in the upper side thereof adapted to receive the front axle of an automobile, there being lugs at the front and rear of said notches, the front lugs being the higher, front and rear tracks on which the said platform may travel, and means whereby the front ends of the rear tracks may be lowered.

4. In a device of the class described, fixed front tracks presenting oppositely disposed inclines, stops at the ends of the tracks, rear tracks mounted for vertical rocking movement, stops on the rear ends of the rear tracks, means to rock the rear tracks to raise or lower the front ends thereof, and a platform mounted to travel on the said tracks and provided with means adapted to be engaged by an automobile in traveling forwardly or backwardly over the said tracks.

JOHN A. BEIERSCHMITT.